US008926853B2

(12) United States Patent
Zhao et al.

(10) Patent No.: US 8,926,853 B2
(45) Date of Patent: Jan. 6, 2015

(54) GRAPHENE STRUCTURES WITH ENHANCED STABILITY AND COMPOSITE MATERIALS FORMED THEREFROM

(76) Inventors: Xin Zhao, Wappingers Falls, NY (US); Yu-Ming Lin, West Harrison, NY (US)

(*) Notice: Subject to any disclaimer, the term of this patent is extended or adjusted under 35 U.S.C. 154(b) by 43 days.

(21) Appl. No.: 13/592,370

(22) Filed: Aug. 23, 2012

(65) Prior Publication Data
US 2014/0057113 A1 Feb. 27, 2014

(51) Int. Cl.
*B44C 1/22* (2006.01)
*B05D 3/10* (2006.01)

(52) U.S. Cl.
USPC .............. 216/83; 216/96; 216/100; 216/103; 427/212; 427/214; 427/216; 427/585; 977/734; 977/773

(58) Field of Classification Search
CPC ..... H01L 21/32134; C23F 1/44; C23C 22/05; C23C 22/27; C08J 7/12; C08J 7/14
USPC ............. 216/83, 96, 100, 103; 427/585, 212, 427/214, 216
See application file for complete search history.

(56) References Cited

U.S. PATENT DOCUMENTS

2011/0091647 A1 4/2011 Colombo et al.
2013/0252101 A1* 9/2013 Zhou et al. .................. 429/217
2013/0327636 A1* 12/2013 Majetich et al. .......... 204/192.34
2013/0330611 A1* 12/2013 Chen et al. .................. 429/211
2014/0022700 A1* 1/2014 Zhao et al. .................. 361/502

OTHER PUBLICATIONS

J. Luo et al., Compression and Aggregation-Resistant Particles of Crumpled Soft Sheets, ACS Nano, 2011, pp. 8943-8949, vol. 5, American Chemical Society, USA.
Y. Chen et al., Aersol Synthesis of Cargo-Filled Graphen Nanosacks, Nano Letters, 2012, Mar. 2012, pp. 1996-2002, vol. 12, American Chemical Society, USA.
X. Li et al., Transfer of Large-Area Graphene Films for High-Performance Transparent Conductive Electrodes, Nano Letters, 2009, pp. 4359-4363, vol. 9, American Chemical Society, USA.
S. Park et al., Chemical Methods for the Production of Graphene, Nature Nanotechnology, Apr. 2009, pp. 217-224, vol. 4, Macmillan Publishers Limited, USA.
K.S. Novoselov et al., Electric Field Effect in Atomically Thin Carbon Films, Science, 2004, pp. 666-669, vol. 306, American Association for the Advancement of Science, USA.
X. Li et al., Large-Area Synthesis of High-Quality and Uniform Graphene Films on Copper Foils, Science, 2009, pp. 1312-1314, vol. 324, American Association for the Advancement of Science, USA.

* cited by examiner

*Primary Examiner* — Shamim Ahmed

(57) ABSTRACT

Aspects of the invention are directed to a method of forming graphene structures. Initially, a cluster of particles is received. The cluster of particles comprises a plurality of particles with each particle in the plurality of particles contacting one or more other particles in the plurality of particles. Subsequently, one or more layers are deposited on the cluster of particles with the one or more layers comprising graphene. The plurality of particles are then etched away without substantially etching the deposited one or more layers. Lastly, the remaining one or more layers are dried. The resultant graphene structures are particularly resistant to the negative effects of aggregation and compaction.

18 Claims, 2 Drawing Sheets

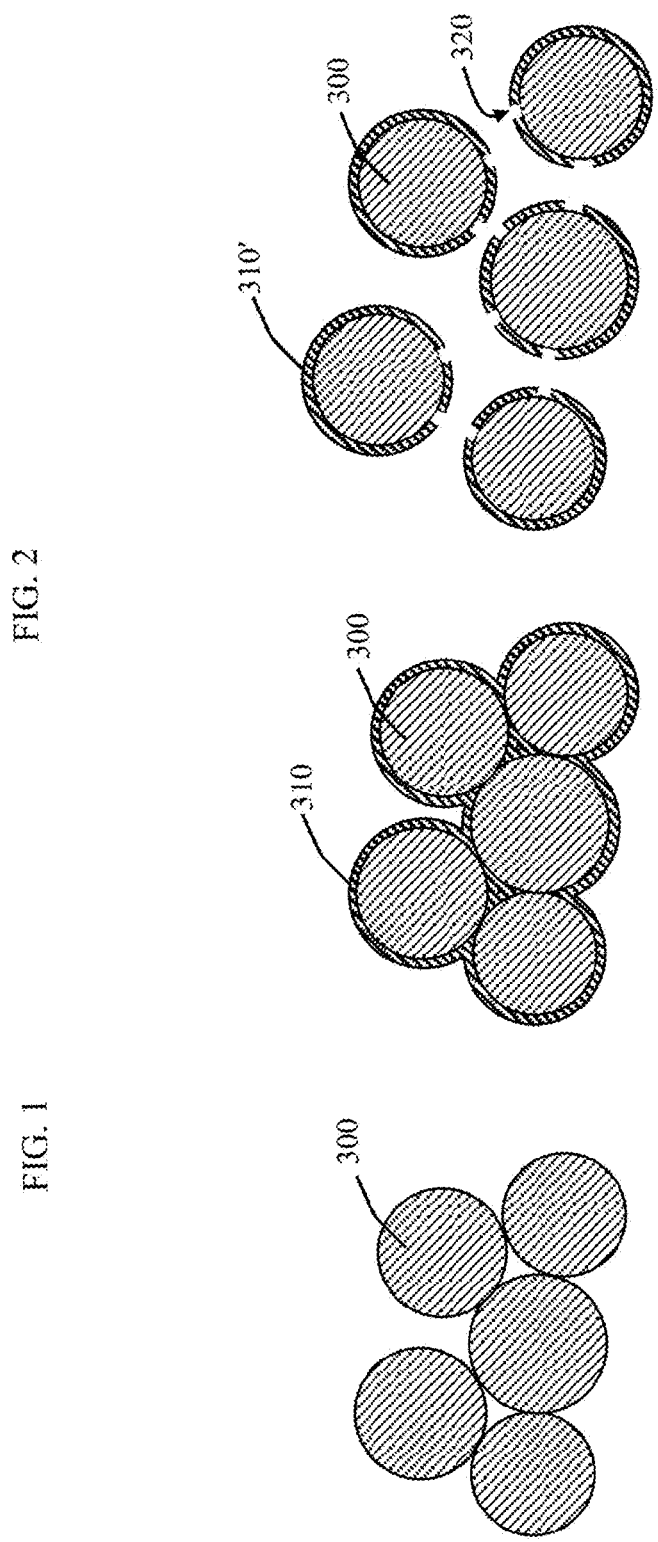

US 8,926,853 B2

GRAPHENE STRUCTURES WITH ENHANCED STABILITY AND COMPOSITE MATERIALS FORMED THEREFROM

FIELD OF THE INVENTION

The present invention relates to graphene structures and composite materials comprising graphene structures.

BACKGROUND OF THE INVENTION

A challenge facing the production of two-dimensional sheet-like materials such as graphene is their strong tendency to aggregate due to the flexibility of the individual sheets and their strong van der Waals attraction to one another. To make matters worse, since these materials typically experience compressive stresses during shaping and manufacturing processes such as drying, calendaring, and pelletizing, their tendency to aggregate is often reinforced by processing. Once aggregated, the technical benefits of such sheet-like materials tend to be diminished. Accessible surface area is reduced, and channels for liquid and gas perfusion between sheet-like materials are concealed or eliminated.

Aggregation of graphene into stacked graphene, for example, remains a challenge when forming graphene via the exfoliation of graphite. One attempt to solve this issue has been to expose the graphene sheets to a surfactant or a solvent that acts to stabilize the graphene sheets and reduce their interlayer interactions. For example, ultrasonic cleavage and chemical exfoliation of graphite frequently entails the use of a surfactant that forms stabilizing layers on each side of the graphene sheets. Nevertheless, once the dispersions are dried, the graphene sheets inevitably begin to aggregate, and making them re-disperse thereafter is extremely difficult. As a result, the adoption of conventional powder processing techniques with graphene synthesized by exfoliation typically yields materials with compromised performance.

An alternative strategy directed at alleviating the interlayer interactions of graphene involves engineering the morphologies of the sheets to form structures that are resistant to the negative effects of aggregation, although this methodology is not admitted as prior art by its inclusion in this Background Section. For example, crumpled graphene balls stabilized by locally folded ridges have been synthesized via evaporating aerosol droplets of graphene oxide (GO). In so doing, the GO sheets were dispersed in water or organic solvents and then rapidly dried, which caused the sheets to deform into highly wrinkled structures as a result of evaporation-induced capillary flow. To restore the conductivity of the structures, the GO was then thermally reduced back to graphene. Unfortunately, the reduction of GO into graphene is almost always incomplete and results in a high degree of structural disorder. Thus, here again, the ultimate product is likely to be compromised.

For the foregoing reasons, there is a need for alternative methods of forming graphene structures with morphologies that are resistant to the negative effects of aggregation and compaction, and are thereby well suited for applications such as reinforced composites, energy storage devices, and sensors.

SUMMARY OF THE INVENTION

Embodiments of the present invention address the above-identified needs by providing novel graphene structures with engineered morphologies that are remarkably stable against aggregation and compaction, and are thereby ideally suited for a variety of applications such as reinforced composites, energy storage devices and sensors.

Aspects of the invention are directed to a method of forming graphene structures. Initially, a cluster of particles is received. The cluster of particles comprises a plurality of particles with each particle in the plurality of particles contacting one or more other particles in the plurality of particles. Subsequently, one or more layers are deposited on the cluster of particles with the one or more layers comprising graphene. The plurality of particles are then etched away without substantially etching the deposited one or more layers. Lastly, the remaining one or more layers are dried.

Additional aspects of the invention are directed to a graphene structure. The graphene structure is formed by initially receiving a cluster of particles with the cluster of particles comprising a plurality of particles with each particle in the plurality of particles contacting one or more other particles in the plurality of particles. Subsequently, one or more layers are deposited on the cluster of particles with the one or more layers comprising graphene. The plurality of particles are then etched away without substantially etching the deposited one or more layers. Lastly, the remaining one or more layers are dried.

Even additional aspects of the invention are directed to a composite material comprising a graphene structure. The graphene structure is formed at least in part by initially receiving a cluster of particles with the cluster of particles comprising a plurality of particles with each particle in the plurality of particles contacting one or more other particles in the plurality of particles. Subsequently, one or more layers are deposited on the cluster of particles with the one or more layers comprising graphene. The plurality of particles are then etched away without substantially etching the deposited one or more layers. Lastly, the remaining one or more layers are dried.

BRIEF DESCRIPTION OF THE DRAWINGS

These and other features, aspects, and advantages of the present invention will become better understood with regard to the following description, appended claims, and accompanying drawings where:

FIG. 1 shows a perspective view of a graphene structure in accordance with a first illustrative embodiment of the invention;

FIG. 2 shows a perspective view of a graphene structure in accordance with the second illustrative embodiment of the invention;

FIGS. 3A-3C show sectional views of intermediate structures in an exemplary method in accordance with aspects of the invention for forming graphene structures;

DETAILED DESCRIPTION OF THE INVENTION

Figure 4:
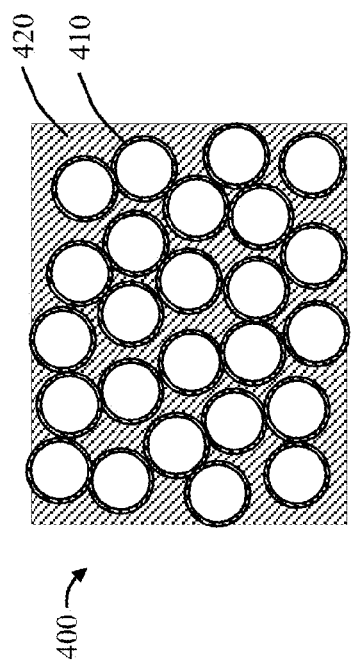
FIG. 4 shows a sectional view of a composite material in accordance with an illustrative embodiment of the invention.

The present invention will be described with reference to illustrative embodiments. For this reason, numerous modifications can be made to these embodiments and the results will still come within the scope of the invention. No limitations with respect to the specific embodiments described herein are intended or should be inferred.

FIGS. 1 and 2 show perspective views of two three-dimensional graphene structures in accordance with illustrative embodiments of the invention. Both illustrative structures are composed of one or more layers of graphene, but have very different morphologies. The first illustrative graphene structure 100 in FIG. 1, for example, describes a hollow spherical shell. The second graphene structure 200 in FIG. 2, in contrast, is characterized by a multitude of folded ridges that form a structure that appears somewhat like a crumpled paper ball. That said, the illustrative structures 100, 200 are presented herein only to illustrate two examples of the multitude of graphene structures that can be formed when aspects of the invention are reduced to practice. Graphene structures within the scope of the invention may in fact take on any number of different morphologies, from hollow spherical, ellipsoid, or deformed cages to heavily folded and compacted structures.

Despite the wide range of possible morphologies, graphene structures like the graphene structures 100, 200 can be formed using similar processing methods. FIGS. 3A-3C show sectional views of intermediate structures in an exemplary processing sequence in accordance with aspects of the invention that is capable of forming graphene structures like the graphene structures 100, 200. While the sequence of steps and the ultimate products are entirely novel, the exemplary processing sequence utilizes several fabrication techniques (e.g., vapor phase deposition, solution phase deposition, wet etching, and drying,) that will already be familiar to one having ordinary skill in, for example, the semiconductor or nanotechnology fabrication arts. Many of these conventional fabrication techniques are also described in readily available publications, such as: W. Choi, et al., *Graphene: Synthesis and Applications*, CRC Press, 2011; D. B. Mitzi, *Solution Processing of Inorganic Materials*, John Wiley & Sons, 2009; M. Kohler, *Etching in Microsystem Technology*, John Wiley & Sons, 2008; P. M. Martin, *Handbook of Deposition Technologies for Films and Coatings: Science, Applications, and Technology*, William Andrew, 2009; and E. Tsotsas et al., *Modern Drying Technology: Product Quality and Formulation*, John Wiley & Sons, 2011, which are all hereby incorporated by reference herein. The conventional nature of many of the fabrication techniques further facilitates the use of largely conventional and readily available tooling.

The exemplary method starts in FIG. 3A with a plurality of particles 300. As shown in this figure, the plurality of particles 300 form a cluster, meaning that each of the particles 300 contacts one or more other particles 300 in the cluster. While the particles 300 in this embodiment are spherical, this need not be the case and the particles 300 may instead describe many alternative shapes (e.g., ellipsoids, rods, tubes, columns, wires, pills, sheets, faceted shapes). If spherical particles 300 are chosen, the particles 300 may, for instance, have an average diameter in the nanometer to millimeter range. The particles 300 are preferably formed of a material that both: 1) acts as an effective substrate for the deposition (i.e., synthesis) of graphene; and 2) can later be selectively etched away without damaging the deposited graphene. The particles 300 may, for example, be formed from a transition metal such as, but not limited to, copper (Cu), nickel (Ni), cobalt (Co), iron (Fe), ruthenium (Ru), and iridium (Ir). Suitable particles 300 may be obtained from a number of commercial sources including US Research Nanomaterials, Inc. (Houston, Tex., USA).

The cluster of particles 300 in FIG. 3A is subsequently exposed to graphene synthesis wherein one or more layers of graphene are deposited on the cluster of particles 300. Each of the one or more layers of graphene substantially comprises a respective one-atomic-layer-thick sheet of $sp^2$-hybridized carbon. Graphene can be synthesized by several methods. High quality graphene has been synthesized by, for example, chemical vapor deposition (CVD). U.S. Patent Publication No. 2011/0091647, to Colombo et al. and entitled "Graphene Synthesis by Chemical Vapor Deposition," hereby incorporated by reference herein, for example, teaches the CVD of graphene on metal and dielectric substrates using hydrogen and methane in an otherwise largely conventional CVD tube furnace reactor. Graphene CVD has been demonstrated by, for example, loading a transition metal substrate (e.g., copper (Cu)) into a CVD tube furnace and introducing hydrogen gas at a rate between 1 to 100 standard cubic centimeters per minute (sccm) while heating the substrate to a temperature between 400 degrees Celsius (° C.) and 1,400° C. These conditions are maintained for a duration of time between 0.1 to 60 minutes. Next methane is introduced into the CVD tube furnace at a flow rate between 1 to 5,000 sccm at between 10 mTorr to 780 Torr of pressure while reducing the flow rate of hydrogen gas to less than 10 sccm. Graphene is synthesized on the metal substrate over a period of time between 0.001 to 10 minutes following the introduction of the methane. The same reference also teaches that the size of CVD graphene sheets (i.e., size of CVD graphene domains) may be controlled by varying CVD growth parameters such as temperature, methane flow rate, and methane partial pressure.

FIG. 3B shows the intermediate structure formed by depositing a graphene coating 310 onto the cluster of particles 300 shown in FIG. 3A by, for example, graphene CVD. The graphene coating 310 may consist of just one layer of graphene or may consist of several layers. Notably, because the particles 300 in the cluster are in direct contact with other particles 300, the reactants in the CVD process do not have an opportunity to reach the entire surface of each of the particles 300. As a result, the resultant graphene coating 310 does not completely coat (i.e., cover) each of the particles 300. In other words, there is an absence of graphene at the contact points of the closely packed particles 300.

Subsequent processing leverages these openings in the graphene coating 310 to selectively remove the particles 300 while leaving the graphene coating 310 substantially intact. In one or more embodiments, such a step is performed by wet etching, that is, by submersing the particles 300 and the graphene coating 310 into an appropriate etchant (i.e., solvent). FIG. 3C shows the particles 300 and the graphene coating 310 after initially being immersed into a solvent. Here, the immersion in the solvent acts to separate the particles 300 from one another and, in so doing, separates the graphene coating 310 into several distinct graphene shells 310', with each graphene shell 310' corresponding to a respective one of the particles 300. Several openings 320 in the distinct graphene shells 310' are thereby exposed. The openings 320, in turn, form access points for the solvent to contact the particles 300 and etch them away isotropically.

The solvent is preferably chosen such that it is capable of etching away the particles 300 without substantially modifying their respective distinct graphene shells 310'. The choice of solvent may depend on the composition of the particles. Generally, the metal particles may be selectively etched in a solution comprising iron chloride ($FeCl_3$), iron nitrate ($Fe(NO_3)_3$) and ammonium persulfate (($NH_4)_2S_2O_8$) dissolved in hydrochloric acid (HCl), or nitric acid ($HNO_3$).

After etching the particles 300 away, the resultant distinct graphene shells 310' are preferably washed one or more times and then dried. Washing may be in, for example, water and/or acetone and facilitates the removal of any remaining residual materials from the particles 300 and the etching process. Drying may be by any one of several methods, including, but not limited to, freeze drying, spray pyrolysis, fast-ramp heating, or supercritical drying (with, e.g., carbon dioxide).

At a given drying rate, removal of the solvent tends to exert a capillary force on the distinct graphene shells 310'. The morphology of the resultant graphene structures, in turn, depends on the size and thickness of the distinct graphene shells 310'. Distinct graphene shells 310' with a small lateral size (e.g., less than about 50 nanometers) and those comprising several layers of graphene (e.g., more than about five layers of graphene) tend to be able to maintain a hollow cage-like structure due to their comparatively rigid graphene shells, which can accommodate the compressing capillary forces during solvent droplet shrinkage. Hence, under these conditions, hollow spherical and ellipsoid graphene structures like the graphene structure 100 in FIG. 1 may be collected after drying. In contrast, distinct graphene shells 310' with a slightly larger lateral size or fewer layers of graphene undergo partial flattening and larger deformation during drying, and the resultant graphene structures appear as distorted graphene cages. Further increasing the lateral size of the distinct graphene shells 310' into the submicron or micrometer range leads to isotropic compression of the distinct graphene shells 310' during solvent droplet shrinkage, and results in graphene structures more similar to the graphene structure 200 in FIG. 2. These graphene structures are characterized by a number of folded ridges, giving an overall crumpled appearance.

The ultimate morphology of the graphene structures produced using the method set forth above with reference to FIGS. 3A-3C may thereby be tailored by choosing the initial size of the particles 300 (which ultimately affects the lateral size of the resultant distinct graphene shells 310') and the number of layers of graphene forming the distinct graphene shells 310'. A smaller lateral size and a greater number of graphene layers favor distinct graphene shells 310' that maintain a hollow cage-like structure. A larger lateral size and a fewer number of graphene layers tends to favor graphene structures with more deformation, flattening, and folding.

Because of their unique morphologies, graphene structures formed in accordance with aspects of the invention are well suited to several different technological applications. Graphene structures characterized by smooth or somewhat deformed hollow graphene cages are stabilized by robust carbonaceous shells so that they resist aggregation and maintain their high surface area even when compressed. Graphene structures instead characterized by a crumpled appearance are likewise stabilized against aggregation and compression by their many folded ridges. At the same time, both of these types of graphene structures present favorable free volumes and inter-layer voids. Moreover, owing to the highly elastic nature of graphene, the present graphene structures are resistant to tearing.

Graphene structures in accordance with aspects of the invention may, for instance, be blended with one or more other materials to form composite materials. A sectional view of such an illustrative composite material 400 comprising hollow graphene shells 410 blended with another material 420 is shown in FIG. 4. The material blended with the graphene structures can be any number of different materials depending on the application. To prepare a composite material incorporating graphene structures and a polymeric or ceramic material, for example, the graphene structures can be mixed with the polymer or ceramic while that other material is in a solid, liquid, or suspension state. Subsequently, the mixture can be solidified through casting, molding, or pressing. Alternatively, to prepare a composite material incorporating the present graphene structures and a metal, metal oxide, or, again, a polymer material, the other material can be directly deposited on the graphene structures. Viable vapor phase deposition techniques include, but are not limited to, CVD, thermal evaporation, and sputtering. Solution phase approaches include, but are not limited to, co-precipitation, hydrothermal deposition, and electrochemical deposition. Independent of whether blending or deposition is ultimately utilized, the monodisperity of the present graphene structures (i.e., their uniformity in molecular weight) allows their concentrations to be precisely controlled and thereby enhances ease of processing.

Inclusion of the present graphene structures in composite materials in this manner is expected to produce a number of advantages. Because of their resistance to aggregation and compaction, for example, the graphene structures set forth herein represent superb reinforcing fillers when compared with solid particles or flat graphene. As a result, the mechanical strength of a composite material in which they are included will demonstrate increased mechanical strength, even when the graphene structures are included at low filling concentrations. The present graphene structures also make it possible to tailor the electrical and thermal conductivities of a composite material.

The graphene structures set forth herein may also be utilized as a supporting template to immobilize other functional elements in a composite material. The present graphene structures may, for example, be blended with noble metal nanoparticles, metal oxide nanoparticles, and/or quantum dots to form novel composite materials directed at catalytic, electronic, and magnetic applications. In such composite materials, the present graphene structures will act to both strengthen the resultant composite material and, at the same time, prevent the migration and segregation of the functional elements.

Finally, composite materials containing graphene structures in accordance with aspects of the invention may be of particular benefit in energy storage devices such as batteries, supercapacitors, and fuel cells. Here, the fully accessible surface area and porosity of the present graphene structures facilitate their charge storage capability by providing enhanced surface area for ion adsorption and numerous transport channels for electrolyte diffusion.

Figure 5:
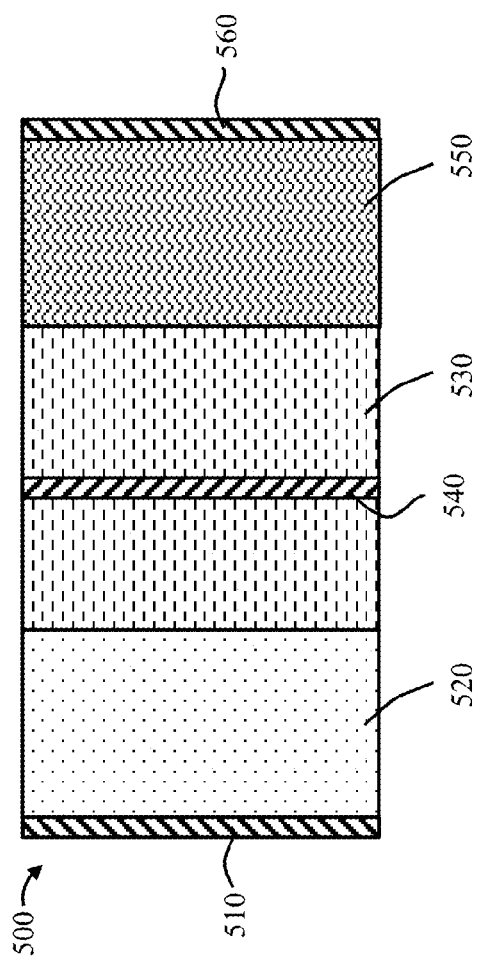
FIG. 5 shows a sectional view of a battery in accordance with an illustrative embodiment of the invention.

FIG. 5 shows a sectional view of a lithium-ion battery 500 in accordance with an illustrative embodiment of the invention in which the present graphene structures may be utilized. The lithium-ion battery 500 includes a positive current collector 510, a cathode 520, an electrolyte 530, a separator 540, an anode 550, and a negative current collector 560. Lithium-ion batteries are widely manufactured and are described in several references, including K. Ozawa, *Lithium Ion Rechargeable Batteries*, John Wiley & Sons, 2012, which is hereby incorporated by reference herein.

In one or more embodiments, graphene structures in accordance with aspects of the invention may, for example, be mixed with a polymer binder such as, but not limited to, poly(vinylidene fluoride) (PVDF) or poly(acrylic acid) (PAA) with a predetermined ratio to form the anode 550. Alternatively, an additional active material, for example, a metal (e.g., Si, Ge, Sn), a transition metal oxide (e.g., $SnO_2$, $Fe_xO_y$, $MnO_2$), a conducting polymeric material (e.g., PANi, PPy, PEDOT), or a carbon material (e.g. graphite flake, soft carbon, hard carbon) may be mixed with the graphene structures to form a composite anode 550. The cathode 520 may, in turn, comprise a lithium metal phosphate or lithium metal oxide (e.g., $LiFePO_4$, $LiMnPO_4$, $LiCoO_2$, $LiMn_2O_4$, $LiNiO_2$, $LiNi_xMn_yCo_zO_2$) with a polymeric binder and conducting carbon black or graphite. The positive current collector 510 may comprise, for example, aluminum (Al), while the negative current collector 560 may comprise copper (Cu). The separator 540 may be a microporous membrane made from polyolefins, including, but not limited to, polyethylene, polypropylene, and polymethylpentene. Such separators are commercially available from sources such as Celgard LLC, (Charlotte, N.C., USA). Finally, the electrolyte 530 may consist of a lithium metal salt solvated in an appropriate solvent. Typical electrolytes include a lithium salt such as lithium hexafluorophosphate ($LiPF_6$), lithium tetrafluoroborate ($LiBF_4$), and lithium perchlorate ($LiClO_4$) in an organic solvent such as ethylene carbonate, dimethyl carbonate, and diethyl carbonate. Suitable salts and solvents for the electrolyte 530 can be obtained from, for example, Sigma-Aldrich (St. Louis, Mo., USA).

In forming the present graphene structures, it should be emphasized that these graphene structures can be formed without the need to thermally or chemically reduce graphite oxide, graphite fluoride, graphene oxide, or graphene fluoride. As indicated earlier, the reduction of such oxides and fluorides to acquire graphene is known to create structural disorder and introduce defects into the resultant structures. Graphene CVD, in comparison, produces a substantially defect and contaminant-free product while also providing excellent control over dimensions and numbers of layers.

The above-described embodiments of the invention are intended to be illustrative only. Other embodiments can use different processing steps, and different types and arrangements of elements to implement the described functionality. These numerous alternative embodiments within the scope of the appended claims will be apparent to one skilled in the art.

Moreover, all the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in 35 U.S.C. §112, ¶6. In particular, the use of "step of" in the claims herein is not intended to invoke the provisions of 35 U.S.C. §112, ¶6.

What is claimed is:

1. A method comprising the steps of:
   receiving a cluster of particles, the cluster of particles comprising a plurality of particles with each particle in the plurality of particles contacting one or more other particles in the plurality of particles;
   depositing one or more layers on the cluster of particles, the one or more layers comprising graphene;
   etching away the plurality of particles without substantially etching the deposited one or more layers; and
   drying the remaining one or more layers.

2. The method of claim 1, further comprising a step of washing the remaining one or more layers after the etching step and before performing the drying step.

3. The method of claim 2, wherein the washing step comprises exposing the remaining one or more layers to at least one of water and acetone.

4. The method of claim 1, wherein the drying step comprises at least one of freeze drying, spray pyrolysis, heating, and supercritical drying.

5. The method of claim 1, wherein the plurality of particles comprise a transition metal.

6. The method of claim 5, wherein the transition metal comprises copper, nickel, cobalt, iron, ruthenium, or iridium.

7. The method of claim 1, wherein the plurality of particles have an average diameter between about one nanometer and about one millimeter.

8. The method of claim 1, wherein the plurality of particles are substantially spherical or substantially ellipsoid.

9. The method of claim 1, wherein the depositing step comprises chemical vapor deposition.

10. The method of claim 9, wherein the chemical vapor deposition utilizes at least methane and hydrogen.

11. The method of claim 1, wherein each particle in the plurality of particles is not completely coated by the one or more layers during the depositing step.

12. The method of claim 1, wherein the etching step comprises wet etching.

13. The method of claim 12, wherein the wet etching utilizes at least one of iron chloride, iron nitrate, ammonium persulfate, hydrochloric acid, and nitric acid.

14. The method of claim 1, further comprising the step of mixing a product of the drying step with another material to form a composite material.

15. The method of claim 1, further comprising the step of depositing another material on a product of the drying step to form a composite material.

16. The method of claim 1, further comprising the step of installing a product of the drying step into an energy storage device.

17. The method of claim 16, wherein the energy storage device comprises a lithium-ion battery.

18. The method of claim 1, wherein the method does not comprise reducing all of graphene oxide, graphene fluoride, graphite oxide, and graphite fluoride.

* * * * *